United States Patent
Sandahl et al.

(10) Patent No.: US 7,535,685 B2
(45) Date of Patent: May 19, 2009

(54) RADIO FREQUENCY SIGNAL COUPLER, COUPLING SYSTEM AND METHOD

(75) Inventors: Todd W. Sandahl, E. Walpole, MA (US); Bruce A. Renz, Columbus, OH (US); Philip M. Trioli, New Boston, NH (US)

(73) Assignee: Amperion, Inc., Lowell, MA (US)

( * ) Notice: Subject to any disclaimer, the term of this patent is extended or adjusted under 35 U.S.C. 154(b) by 327 days.

(21) Appl. No.: 11/344,775

(22) Filed: Jan. 31, 2006

(65) Prior Publication Data

US 2007/0178850 A1      Aug. 2, 2007

(51) Int. Cl.
    H02H 7/04      (2006.01)
(52) U.S. Cl. .......................................... 361/38; 361/39
(58) Field of Classification Search .................. 361/35, 361/38, 39; 340/310.15, 310.17; 375/258
    See application file for complete search history.

(56) References Cited

U.S. PATENT DOCUMENTS

| 4,026,505 | A | 5/1977 | Geiger et al. |
| 5,864,284 | A | 1/1999 | Sanderson |
| 6,200,102 | B1 * | 3/2001 | Diaz ........................... 417/50 |
| 6,452,482 | B1 * | 9/2002 | Cern ........................... 375/258 |
| 6,952,060 | B2 * | 10/2005 | Goldner et al. ............... 310/12 |
| 7,154,727 | B2 * | 12/2006 | Ghahary ..................... 361/119 |
| 2002/0002040 | A1 | 1/2002 | Kline et al. |
| 2007/0014529 | A1 * | 1/2007 | Zitting ........................ 385/147 |

OTHER PUBLICATIONS

Handbook of Transformer Design and Application/William M. Flanagan-2nd ed. published 1993 by McGraw Hill, Inc.*

* cited by examiner

Primary Examiner—Danny Nguyen
(74) Attorney, Agent, or Firm—Rahman LLC

(57) ABSTRACT

A radio frequency (RF) signal coupling system, comprising a shunt device and a coupling unit for cooperative engagement with a MV power network and an RF modem. The shunt device has a high voltage terminal connected to an electrical cable of the power network and a low voltage terminal. The coupling unit comprises a signal lead connected to the low voltage terminal of the shunt device, a ground lead connected to earth ground, a coupling transformer and an impedance matching and protection circuitry. The coupling transformer comprises a ferrite ring, a multiple turn primary winding having a first end and a second end, the first end being connected to the signal lead and the second end being connected to the ground lead, and a multiple turn secondary winding having two terminals connected to the impedance matching and protection circuitry for providing the RF signal to the RF modem.

23 Claims, 8 Drawing Sheets

RADIO FREQUENCY SIGNAL COUPLER, COUPLING SYSTEM AND METHOD

TECHNICAL FIELD

The present invention pertains to power line communication. More particularly, this application relates to coupling radio-frequency signals to and from a medium-voltage (MV) cable of a power distribution network, while the distribution network is supplying electrical power. The radio-frequency signals may be used for a variety of communication applications such as high-speed data transfer and utility grid controlling and monitoring.

BACKGROUND ART

Power line communication (PLC), also called Broadband over Power Lines (BPL), is a technology that uses electrical power networks to transmit data and voice signals in providing online services. Recently, high-speed radio frequency (RF) data transmission over medium voltage (MV) power lines has become feasible. A variety of PLC-based broadband services, such as high-speed Internet connection, video on demand, electric grid modernization and telecommuting, are being developed.

In PLC, the communication signals coexist, but do not interact, with the standard 50 or 60 Hz alternating current (AC). The signals travel along the power lines and pass through or around utility transformers to service subscribers' homes and businesses, as well as to utility controlling and monitoring equipment.

A subscriber, or a utility monitoring device such as a meter, uses a modem to extract the communication signals from the power lines and to inject such communication signals into the power line. The modem is connected to the power line via a coupling system. For a power line to accommodate high-speed communications, the coupling system must be designed so that it can efficiently couple radio-frequency signals to and from the power network. Such a coupling system must not compromise the performance of the existing power system. It must be able to shield various low-voltage electronic components of the RF modem from high voltage, steady state and transient electrical power, and it must tolerate the harsh physical and electrical environment associated with MV overhead power lines, including exposure to high voltage surges associated with lightning strikes and switching surges. In practice, such a coupling system must be inexpensive, compact, environmentally acceptable, essentially maintenance free, safe and easy to install.

Various capacitive or inductive coupling systems exist. One example of the coupling systems is a so-called converter described in Sanderson (U.S. Pat. No. 5,864,284). The converter comprises a lightning arrester (a shunt device common to power utility operations) and a signaling device for coupling an RF signal. The signaling device comprises an RF modem coupled to an RF transformer. A high-voltage terminal of the arrester is connected to the power cable and a low-voltage terminal of the arrester is connected to a terminal of the transformer. Another terminal of the transformer is connected to a neutral node (earth ground). The low-voltage terminal of the arrester is also directly connected to the neutral node via a piece of grounding cable.

During installation of the coupling system, one or more ferrite cores are typically placed around the grounding cable in order to increase the RF impedance between the low-voltage terminal of the arrester and the neutral node. This kind of installation normally involves field configuration to modify an existing arrester installation by way of stacking ferrite cores around the grounding cable, which requires trained personnel and test equipment.

The present invention is directed to an RF signal coupling system that avoids the need for field configuration and which has other desirable properties, including the use of a lightning arrester in a manner that avoids the firing of the arrester under fault conditions, and the ability of the coupling system to conduct a fault to earth ground without the need for a parallel path to earth ground.

SUMMARY OF THE INVENTION

The invention provides a radio frequency (RF) signal coupler for cooperative engagement with a shunt device and for cooperative engagement with an RF modem. An RF signal is conducted between a power network and an RF modem through the shunt device and the coupler. The shunt device has a high voltage terminal connected to an electrical cable of the power network and a low voltage terminal. Any compatible, properly-sized shunt device, such as an MV capacitor, resistor or lightning arrester, that is capable of passing signals in the range of 1-80 MHZ may be considered for this application. The coupler comprises a signal lead connected to the low voltage terminal of the shunt device, a ground lead connected to earth ground, and a coupling transformer. The coupling transformer comprises a ferrite ring, a primary winding of multiple turns passing through the hole of the ring, the primary winding having a first end and a second end, the first end being connected to the signal lead and the second end being connected to the ground lead, and a secondary winding of multiple turns passing through the hole of the ring, said secondary winding having two terminals for providing the RF signal to the RF modem. The ratio of the turns of the secondary winding to the turns of the primary winding is at least two to one. The low voltage terminal of the shunt device connects to the earth ground only through the coupler.

The RF signal coupler may further comprise an impedance matching and protection circuit. The circuit has two input ends and two output ends. The two input ends are connected to the two respective terminals of the secondary winding of the coupling transformer, and two output ends provide the RF signal to the RF modem.

BRIEF DESCRIPTION OF THE DRAWINGS

The above and other objects, features and advantages of the invention will become apparent from a consideration of the subsequent detailed description presented in connection with accompanying drawings, in which.

DETAILED DESCRIPTION OF THE INVENTION

Figure 1:
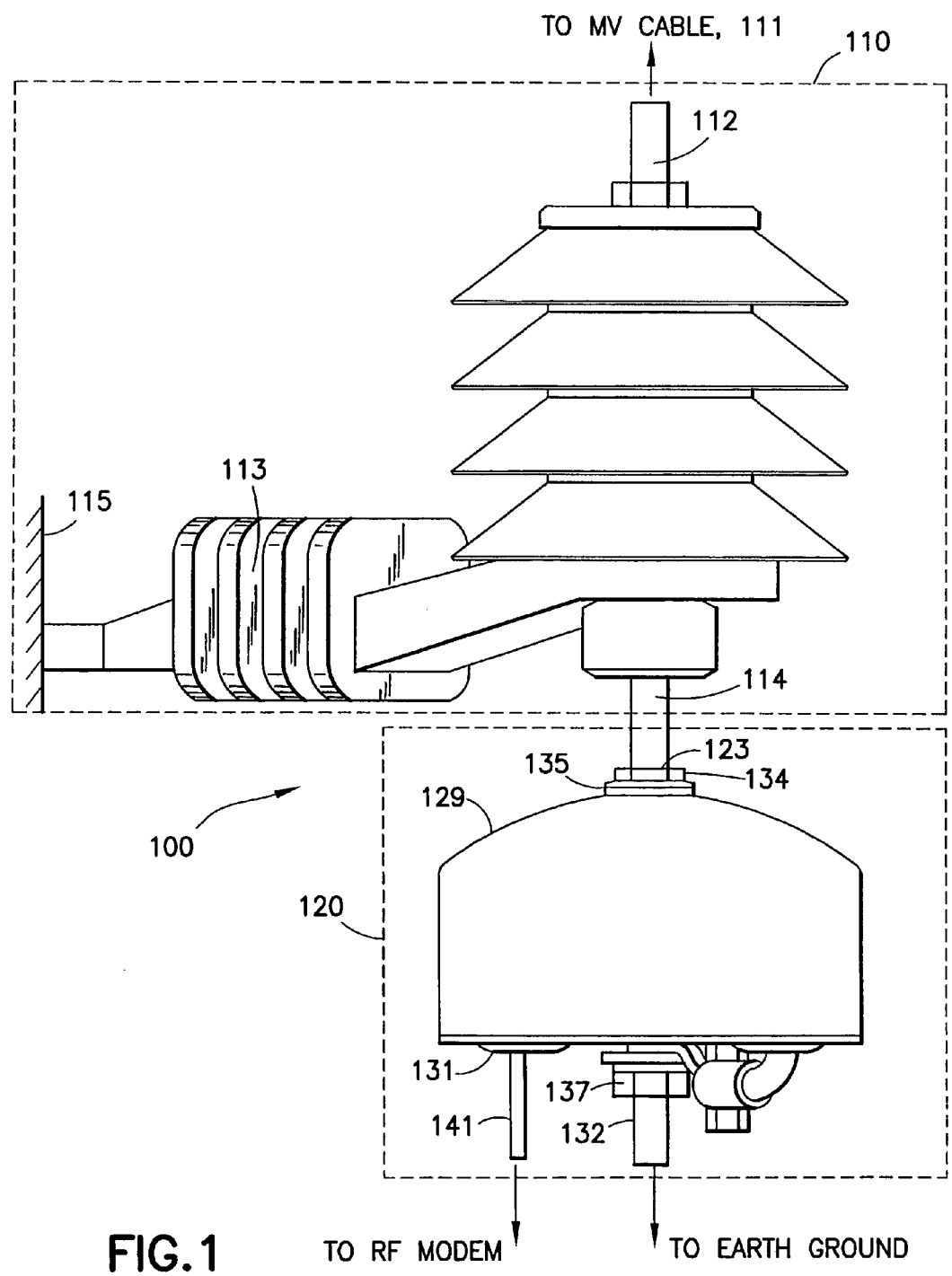
FIG. 1 is a perspective view of a coupling system including a shunt device and a coupler, according to a preferred embodiment of the present invention.

FIG. 1 shows a preferred embodiment of a radio frequency (RF) coupling system 100 comprising a signal coupler 120 for cooperative engagement with a shunt device 110. The shunt device 110 can be a commercial lightning arrester or other similar electrical component. Any compatible, properly-sized shunt device, such as an MV capacitor, resistor or lightning arrester, that is capable of passing signals in the range of 1-80 MHz may be used as the shunt device. For illustrative purposes, this discussion assumes that the shunt device is a commercial lightning arrester. However, when used as a shunt device with coupler 120, the lightning arrester is typically not selected for providing lightning protection, but for providing PLC coupling. That is, the breakdown rating of the lightning arrester is typically selected to be higher than the lighting arresters used in the powerline system that provide lightning protection to the power line system.

The lightning arrester 110 is installed at any suitable location to the MV cable 111. It is typically mounted to a suitable surface 115 via a non-conductive supporting member 113 attached to the arrester. The supporting member is typically part of the lightning arrester.

The lightning arrester comprises a high voltage terminal 112 and a low voltage terminal 114. The high voltage terminal 112 of the lightning arrester is connected to a MV power cable 111. The low-voltage terminal 114 of the lightning arrester is connected to the coupler 120. The coupler 120 has a signal lead 123 and a ground lead 132 and an RF transformer 130 (not shown in FIG. 1 as it is covered by a cap 129). The signal lead 123 is connected to the low-voltage terminal 114 of the lightning arrester. Therefore, the RF signal (typical frequency of 1-50 MHz) is conducted from the high voltage terminal 112 to the low-voltage terminal 114, then to the signal lead 123 of the coupler 120. The RF passes through the coupler and exits the coupler from the ground lead 132 to the earth ground. The coupler extracts the RF signal and the RF signal is conducted through a twisted-pair RF signal cable 141 to an RF port on a signal injector or extractor (also known as an RF modem).

Figure 2:
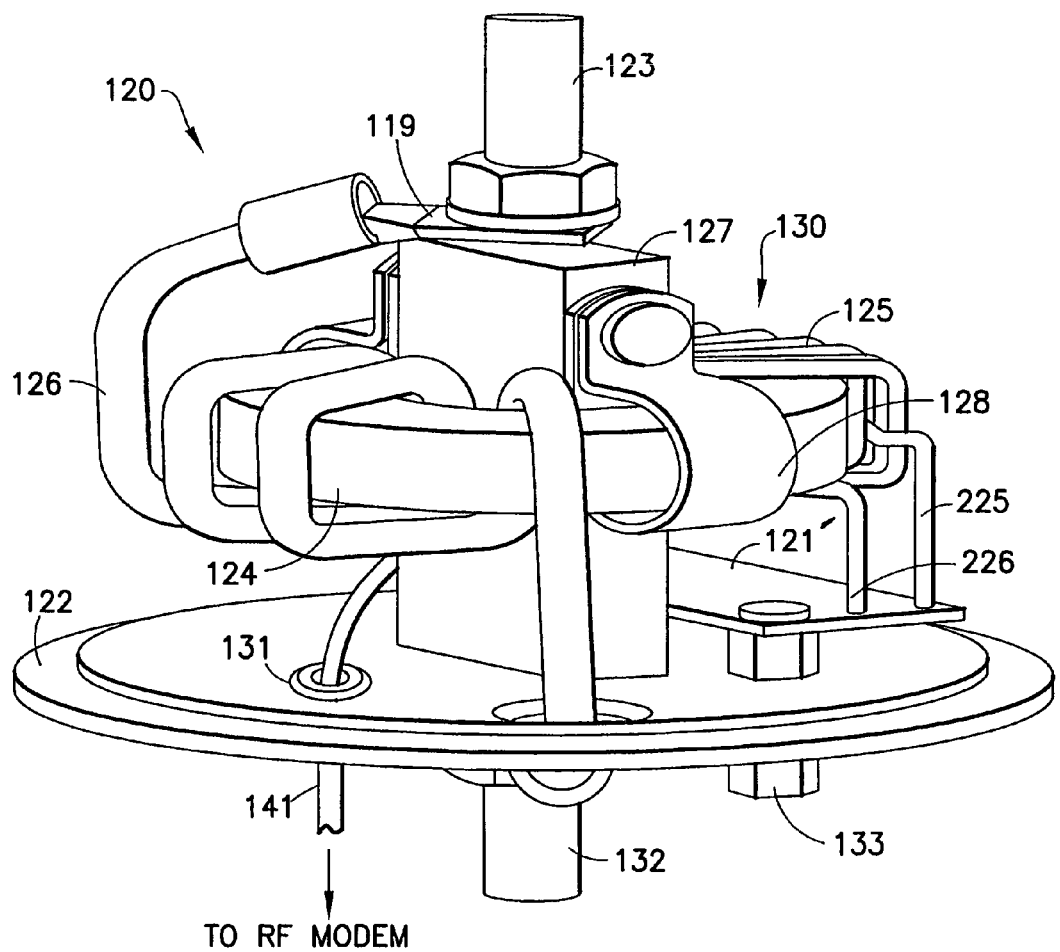
FIG. 2 is a perspective view of the coupler, with cover of the coupler removed.

As shown in FIG. 2, the coupler 120 comprises an RF coupling transformer 130. The RF coupling transformer 130 comprises a ferrite core 124 with a central hole formed therein, a primary winding 126 and a secondary winding 125. One end of the primary winding is connected to the signal lead 123 of coupler 120 and another end of the primary winding is connected to the ground lead 132. Lugs 119, 119' (shown in FIG. 3) are secured to both ends of primary winding 126 to facilitate connection to signal lead 123 and ground lead 132, respectively. The secondary winding 125 has two wire ends 225 and 226.

Figure 4A:
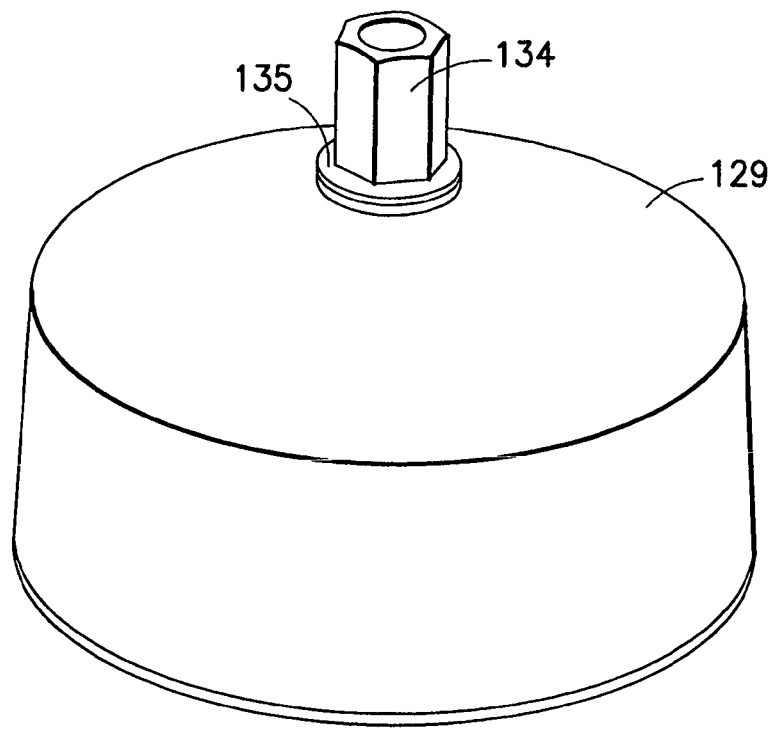
FIG. 4a is an illustration of the coupler cover assembly.
Figure 4B:
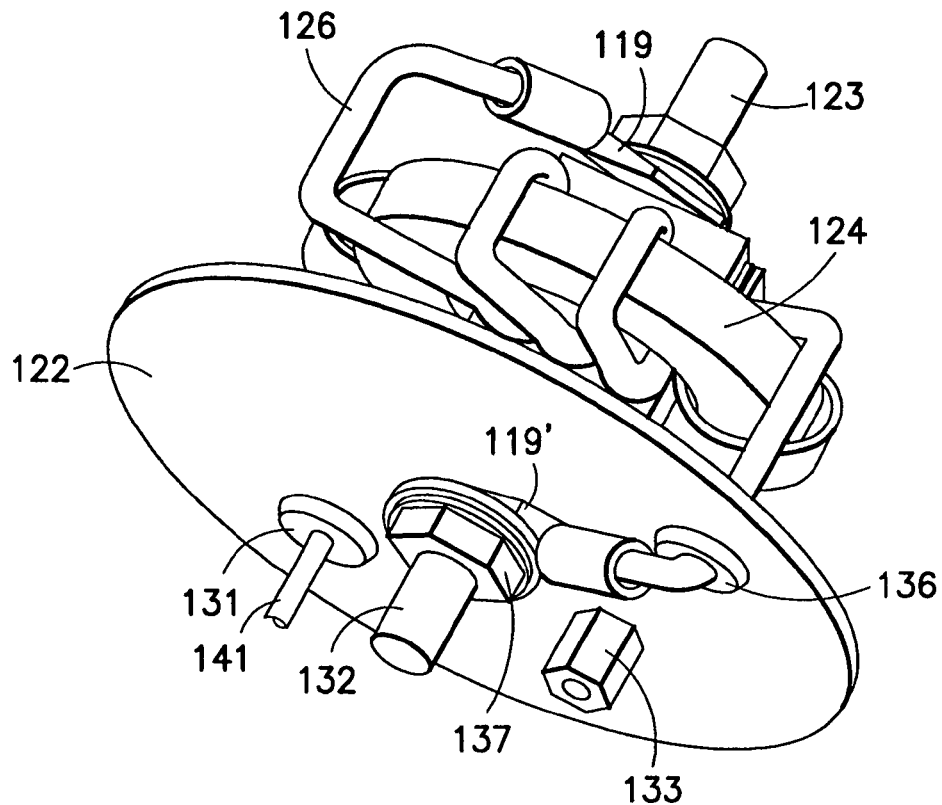
FIG. 4b is a perspective view of the coupler, with the cover removed.

As seen in FIGS. 1, 2 and 4, coupler 120 includes a nonmetallic cover 129, a non-metallic base plate 122 with orifices for passing through wires, a non-conductive support member 127 and one or more fasteners 128 for holding the ferrite core 124. As seen in FIG. 1, cover 129 mates with base plate 122 to form a weather-tight enclosure. As seen in FIG. 4a, a coupler nut 134 and washer 135 secure signal lead 123 (see FIG. 4b) to cover 129. In addition, base plate 122 has a fitting 131 for passage of a twisted-pair signal cable 141 leading to the RF modem at one end and to a printed circuit board 121' at its other end. Also shown is a fitting 136 for passage of one end of primary winding 126 through base plate 122. Ground lead 132 is secured to base plate 122 via nut 137 which in turn secures the primary winding end to the ground lead via lug 119'. A mounting nut 133 passing through the base plate may be used to secure the printed circuit board 121' to base plate 122.

Figure 3:
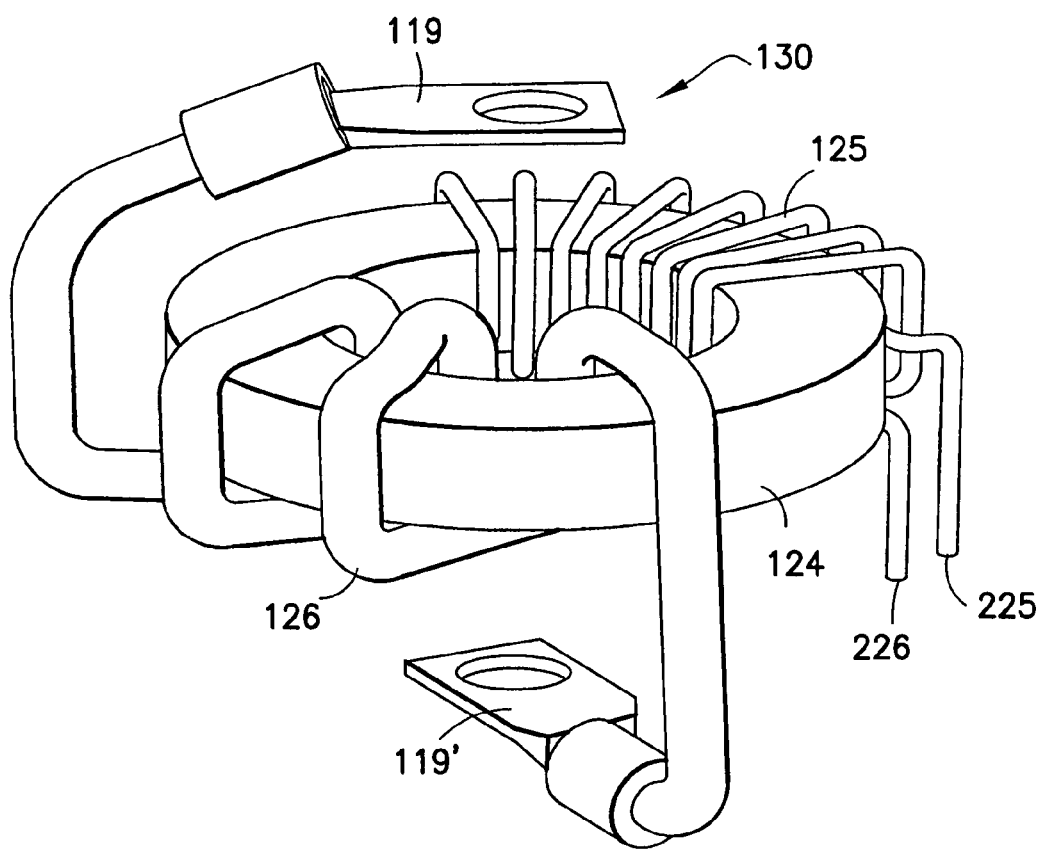
FIG. 3 is a perspective view of the RF coupling transformer of the coupler.

The RF coupling transformer 130 is further shown in FIG. 3. The ferrite core 124 (toroid ring, part No. 5961003801, Fair-Rite Products Corp. Wallkill, N.Y.) is made of a NiZn ferrite material (Material 61 by Fair-Rite Products Corp.). For this ferrite material, the imaginary part of its complex permeability ($\mu''_s$) is substantially higher for the RF frequency (1-100 MHz) signals than for low frequency AC power (50-60 Hz). Therefore, this material is particularly suited for a range of high frequency inductive applications. For use with an RF modem operating within a frequency range of 10-50 MHz, the RF transformer should have an 100 ohm differential complex impedance at wire ends 225, 226. To achieve this impedance, the primary winding 126 comprises at least two turns and preferably three turns around the ferrite core 124 and through the hole of the ferrite core. The primary winding is preferably a No. 6 stranded ground wire. The secondary winding 125 comprises at least four turns and preferably eight turns around the ferrite core and through the hole of the ferrite core. A preferred size for the secondary winding is a No. 20 single core magnet wire. For this particular arrangement, the ratio of turns between the secondary winding and the primary winding is at least 2:1, i.e. at least two turns of secondary winding for every one turn of primary winding. A preferred winding ratio has been discovered to be 8:3 (eight turns of the secondary winding and three turns of the primary winding). The overall design of the transformer is tolerant of voltage and current surges that can accompany a lightning discharge.

The RF signal travels through the primary winding 126 from the signal lead 123 to the ground lead 132, where it enters a cable leading to the earth ground. The RF signal is coupled to the secondary winding 125 and it is conducted by the two wire ends 225 and 226 of the secondary winding to the RF signal cable 141 for connection to an RF modem (not shown).

Unlike what is required in the prior art, in the present invention there is no need for placing one or more ferrite cores around a grounding cable connected in parallel to the coupler in order to increase the RF impedance between the low-voltage terminal of the arrester and the neutral node (earth ground). The coupler of the present invention is a self-contained module that is directly installed with the shunt device. No field configuration is required in the installation of the coupler due to its high frequency complex impedance. This configuration is scalable to various line voltages by way of selection of the appropriate rating of lightning arrester.

Figure 5:
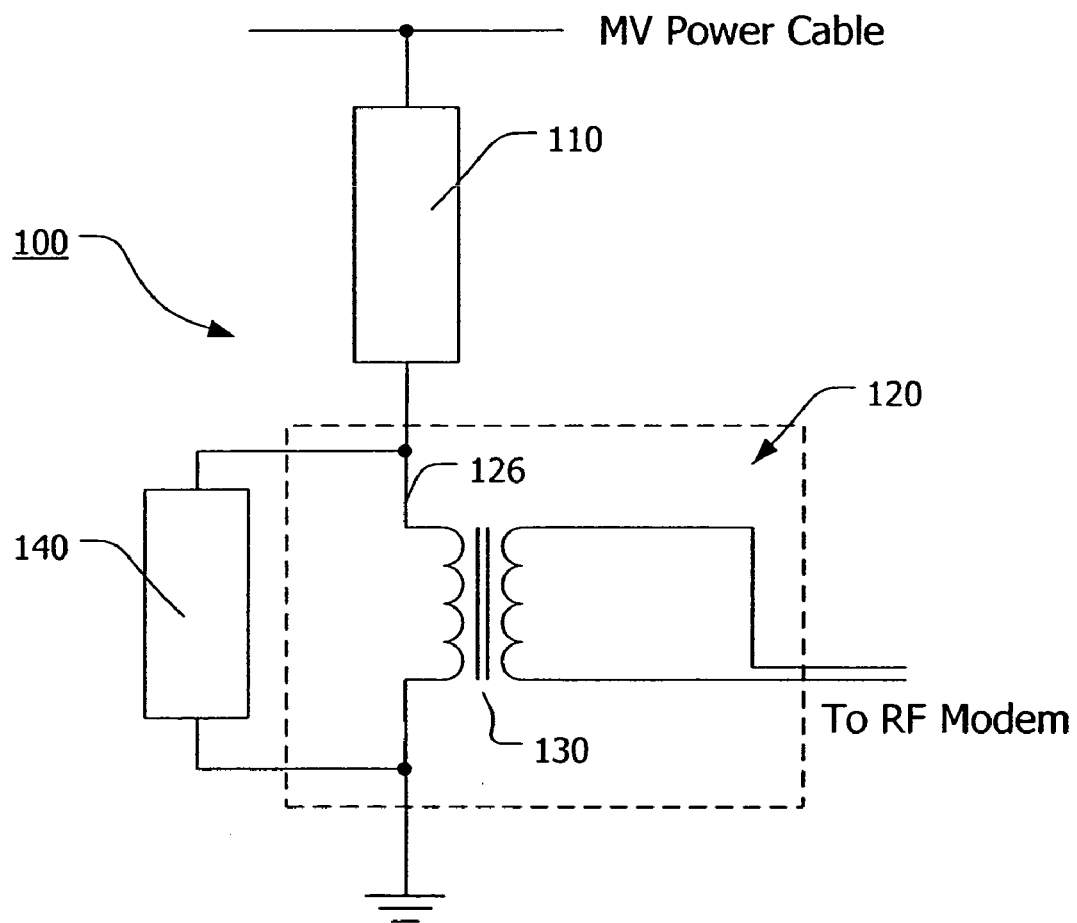
FIG. 5 is a schematic diagram of a first alternative embodiment of the invention.

In a first alternative embodiment of the invention shown in FIG. 5, the coupling system 100 further comprises a resistive device 140 connected in series with the lightning arrester 110 and in parallel with the primary winding 126 of the coupling transformer 130. The resistive device 140 is provided for dominating the characteristic impedance of the coupling transformer to match the impedance of the RF modem. Such a resistive device 140 can be a lightning arrester, preferably a gap-type lightning arrester.

Figure 6:
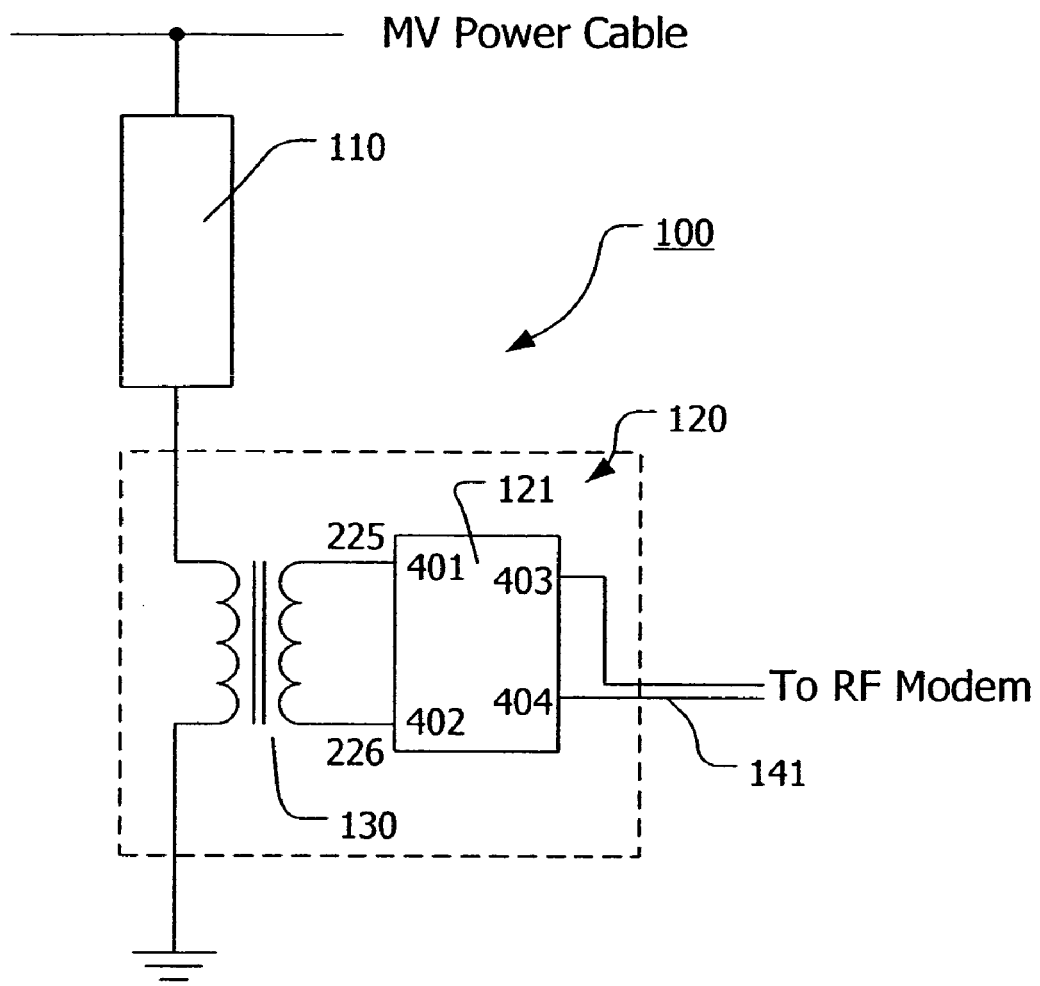
FIG. 6 is a schematic diagram of a second alternative embodiment of the invention.

In a second alternative embodiment of the invention shown in FIG. 6, the coupler 120 further comprises an impedance matching and protection circuit 121 fabricated on the printed circuit board 121' (see FIG. 2). This circuit is connected in parallel to the secondary winding 125 of the coupling transformer 130. The circuit is fabricated with standard components. The circuit 121 has an input end with two terminals 401 and 402 connected to the wire ends 225 and 226, respectively, of the secondary winding, and an output end with two terminals 403 and 404 connected to the twisted-pair RF signal cable 141 leading to the RF modem.

Figure 7:
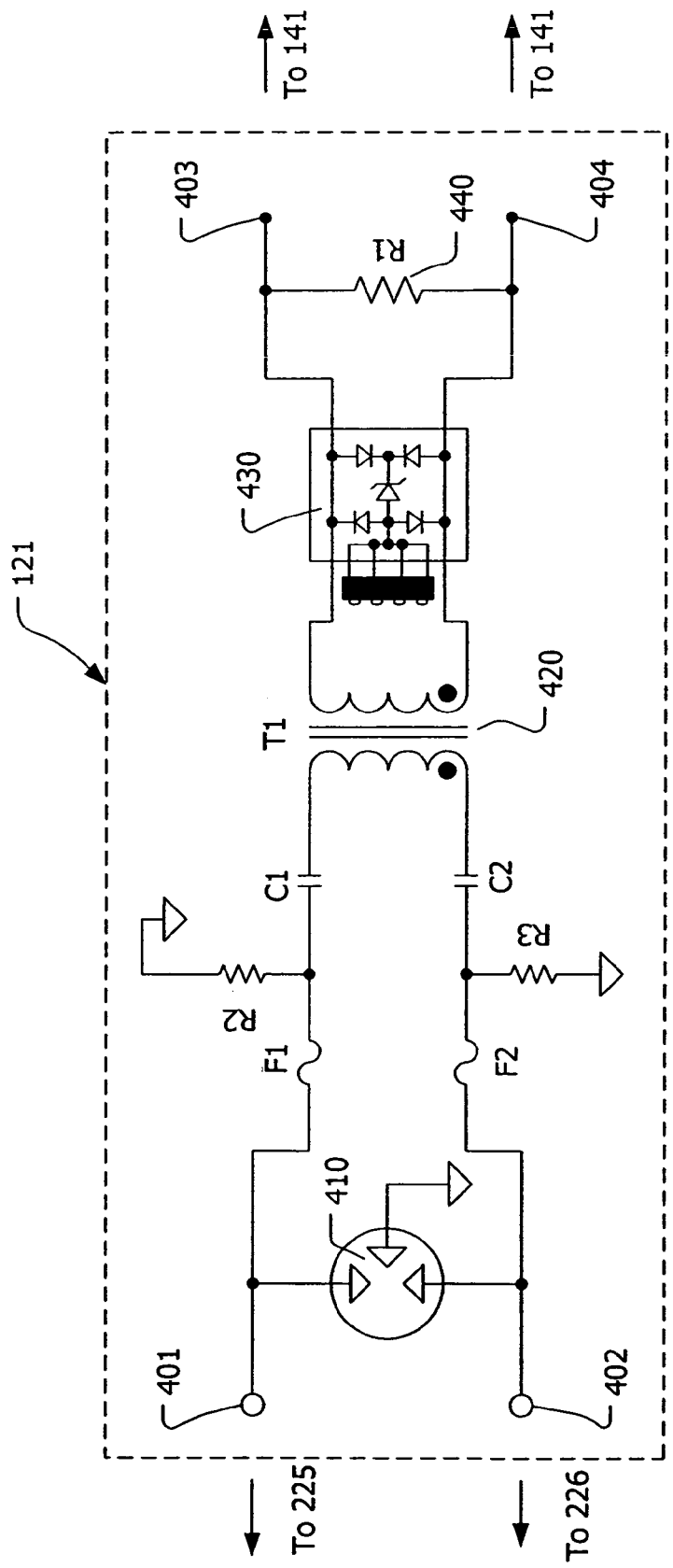
FIG. 7 is an exemplary circuit diagram of an impedance matching and protection circuit.

An exemplary circuit diagram of the impedance match and protection circuit 121 is shown in FIG. 7. The circuit comprises a gas discharge tube 410 connected between the two input terminals 401 and 402 for preventing damages to the circuit caused by high voltage spikes, an RF transformer 420 and a transient voltage suppression (TVS) diode array 430 for providing a balanced differential RF signal to the RF modem, and an 150 ohm resistor 440 for providing a dominating characteristic impedance of the coupler.

Figure 8A:
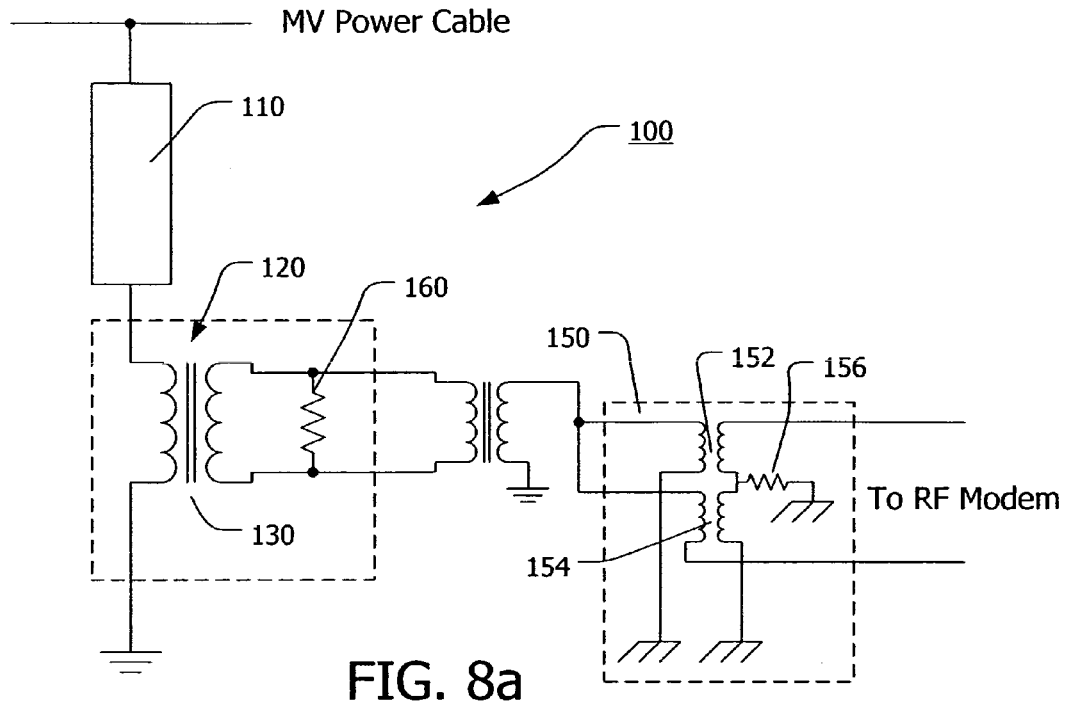
FIG. 8a is a schematic diagram of a third alternative embodiment of the invention.

In a third alternative embodiment of the invention shown in FIG. 8a, the coupling system 100 further comprises an RF power resistor 160 connected in parallel to the secondary winding of the coupling transformer 130, for providing a dominating characteristic impedance of the coupler, and a hybrid combiner/splitter 150. The hybrid combiner/splitter 150 is an RF device known in the art. It comprises a pair of transformers 152 and 154 configured in such a manner as to allow two signal paths (for example, one path for transmitting and one path for receiving) to share a common medium while maintaining a reasonably high degree of isolation. Preferably, the resistance of the resistor 156 inside the hybrid combiner/splitter circuit matches the circuit impedance of the coupler 120.

Figure 8B:
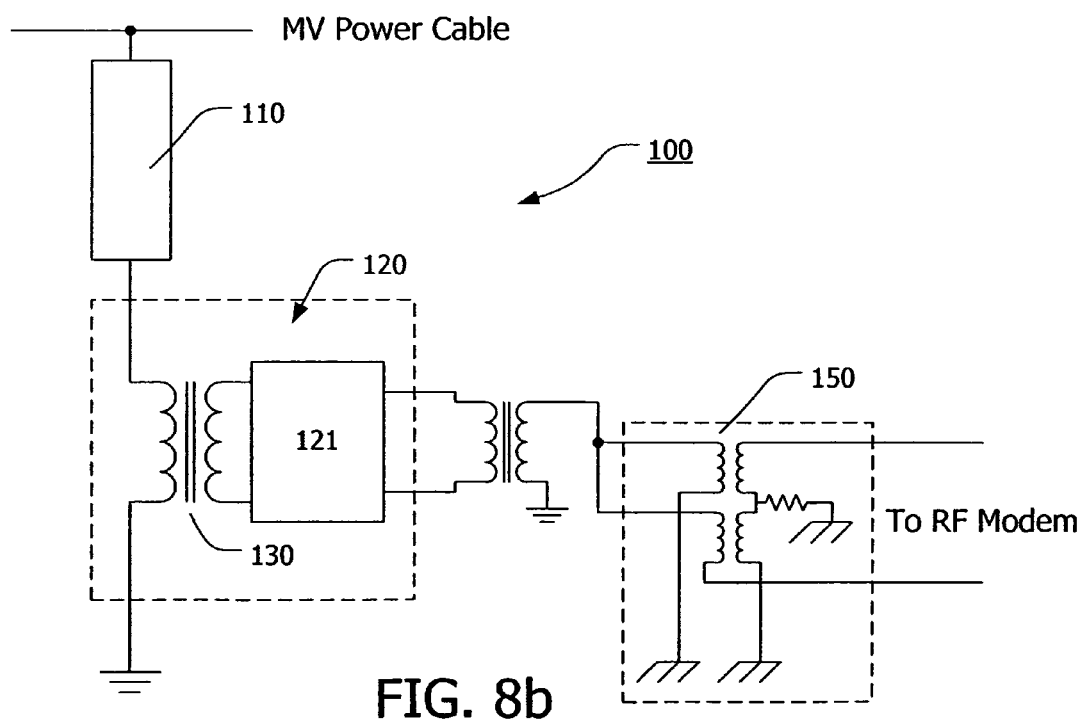
FIG. 8b is another schematic diagram of the third alternative embodiment of the invention.

Alternatively, as shown in FIG. 8b, the power resistor 160 can be replaced by the aforementioned impedance matching and protection circuit 121, in which resistor 440 (see FIG. 7) provides the dominating characteristic impedance of the coupler.

The coupler of the present invention operates bi-directionally. It can transmit and receive communication signals. The RF coupling transformer and the impedance matching circuitry are designed for a particular impedance value and thus suitably packaged for installation without the need for a field configuration.

As stated above, the shunt device 110 may be a lightning arrester. The selected arrester should have a higher breakdown rating than the ratings of the arresters used for the protection of the power grid, thereby decreasing the likelihood of a discharge through the coupler. However, should such a discharge occur, the coupler can normally withstand the associated current and voltage surges.

In summary, the coupler 120 of the present invention receives an RF communication signal that is present on a medium voltage distribution power line, the signal passes from the power line through the shunt device 110 and into the signal lead 123 of the coupler. As the signal passes through the primary winding 126 of the coupling transformer 130, a secondary RF signal is induced on the secondary winding 125 of the coupling transformer. The signal is then conducted to a signal cable 141 leading to a RF modem. The coupler may further contain an impedance match and protection circuit and/or a signal combiner/splitter for further converting the RF signal into to a balanced differential RF signal before passing on to the RF modem. The coupler can be used to transmit and/or receive RF signals. The coupler is designed so that when used with an appropriate shunt device, it can tolerate the harsh environment of a MV overhead power line, without compromising the integrity of that power line.

The present invention has been disclosed in reference to specific examples therein. Numerous modifications and alternative arrangements may be devised by those skilled in the art without departing from the scope of the present invention, and the appended claims are intended to cover such modifications and arrangements.

What is claimed is:

1. A radio frequency (RF) signal coupler (120) comprising:
   a signal lead (123) for connecting to a low voltage terminal (114) of a shunt device (110),
   a ground lead (132) for connecting to earth ground,
   a coupling transformer (130), and
   an impedance matching and protection circuit (121),
wherein the coupling transformer (130) comprises:
   a ferrite ring (124) having a central hole formed therein,
   a primary winding (126) having multiple turns passing around a portion of the ferrite ring so as to pass through the hole of the ring, said primary winding having a first end (119) and a second end (119'), the first end being connected to the signal lead (123) and the second end being connected to the ground lead (132), and
   a secondary winding (125) having multiple turns passing around a portion of the ferrite ring so as to pass through the hole of the ring, said secondary winding having two terminals (225, 226),
wherein the impedance matching and protection circuit (121) comprises:
   two input ends (401, 402) and two output ends (403, 404), the two input ends being connected to the two terminals of the secondary winding of the coupling transformer (225, 226), respectively, the two output ends being connectable to an RF modem,
   a gas discharge tube (410) connected between the two input ends (401, 402),
   an RF transformer (420) having a primary winding and a secondary winding, the primary winding being connected to the two input ends (401, 402) and the secondary winding being connected to the two output ends (403, 404),
   a transient voltage suppression (TVS) diode array (430), connected between the two output ends (403, 404), and
   a resistor (440) being connected between the two output ends (403, 404) for providing a dominating characteristic impedance,
and wherein in the coupling transformer the ratio of turns of the secondary winding (125) to the turns of the primary winding (126) is at least two to one.

2. The RF signal coupler of claim 1, wherein the primary winding (126) of the coupling transformer (130) comprises three turns and the secondary winding (125) of the coupling transformer (130) comprises eight turns.

3. The RF signal coupler of claim 1, wherein in the coupling transformer (130), the ratio of turns of the secondary winding to the turns of the primary winding is 8:3.

4. The RF signal coupler of claim 1, wherein the impedance matching and protection circuit (121) is fabricated on a printed circuit board.

5. The RF signal coupler of claim 1, wherein the RF signal from the two output ends of the impedance matching and protection circuit (121) is conducted to a hybrid combiner/splitter circuit (150) for communication the RF signal to or from the RF modem.

6. The RF signal coupler of claim 1, wherein the ferrite ring (124) of the coupling transformer (130) comprises a NiZn ferrite.

7. The RF signal coupler of claim 6, wherein the primary winding (126) of the coupling transformer (130) comprises three turns of a No. 6 stranded wire and the secondary winding (125) of the coupling transformer (130) comprises eight turns of a No. 20 single core magnetic wire.

8. The RF signal coupler of claim 6, wherein the NiZn ferrite has a complex permeability with an imaginary part ($\mu''_s$) that is substantially higher for the RF frequency signal (1-100 MHz) than for low frequency AC (50-60 Hz).

9. The RF signal coupler of claim 6, wherein the NiZn ferrite material is selected according to its RF characteristics for acting as a high pass filter for frequencies above 1 MHz and blocking lower frequency signals of 50/60 Hz and 150 KHz.

10. The RF signal coupler of claim 1, wherein the coupler (120) is encased in a non-conductive cover assembly comprising a non-metallic cap (129) and a non-metallic base plate (122) to form a weather-tight enclosure.

11. A method for injecting or extracting an RF signal to or from an AC electrical power network, comprising:
   connecting a high voltage terminal (112) of a shunt device (110) to an electrical cable (111) of the power network;
   connecting a low voltage terminal (114) of the shunt device (110) to a signal lead (123) of an RF signal coupler (120);
   connecting a ground lead (132) of the RF signal coupler (120) to earth ground;
   connecting an RF modem to a signal cable (141) of the RF signal coupler (120); and
   injecting or extracting the RF signal to or from the RF modem,
wherein the RF signal coupler (120) comprises a coupling transformer (130) and an impedance matching and protection circuit (121), the coupling transformer (130) comprises:
   a ferrite ring (124) having a central hole formed therein,
   a primary winding (126) having multiple turns passing around a portion of the ferrite ring (124) so as to pass through the hole of the ring, said primary winding having a first end (119) and a second end (119'), the first end (119) being connected to the signal lead (123) and the second end (119') being connected to the ground lead (132), and
   a secondary winding (125) having multiple turns passing around a portion of the ferrite ring (124) so as to pass through the hole of the ring, said secondary winding having two terminals (225, 226),
the impedance matching and protection circuit (121) comprises:
   two input ends (401, 402), connected to the two terminals of the secondary winding of the coupling transformer (225, 226), respectively,
   two output ends (403, 404), connected to the RF modem through the signal cable (141), and
   a circuitry connected between the input ends (401, 402) and output ends (403, 404) for providing surge protection and impedance matching functions,
and wherein in the coupling transformer (130) the ratio of turns of the secondary winding to the turns of the primary winding is at least two to one.

12. The method of claim 11, wherein the RF signal is used for transferring data between a plurality of subscribers of a communication network service, controlling a device of the electrical power network, or monitoring operations of said electrical power network.

13. A system (100) for coupling a radio frequency (RF) signal to or from a medium voltage (MV) cable (111) of a electrical power network, comprising:
   a shunt device (110) having a high voltage terminal (112) connected to the MV cable (111) and a low voltage terminal (114), and
   a coupling transformer (130), and
   an impedance matching and protection circuit (121),
wherein the coupling transformer (130) comprises:
   a signal lead (123) connected to the low voltage terminal (114) of the shunt device (110),
   a ground lead (132) for connecting to the earth ground,
   a ferrite ring (124) having a central hole formed therein,
   a primary winding (126) having multiple turns passing around a portion of the ferrite ring so as to pass through the hole of the ring, said primary winding having a first end (119) and a second end (119'), the first end being connected to the signal lead (123) and the second end being connected to the ground lead (132), and
   a secondary winding (125) having multiple turns passing around a portion of the ferrite ring so as to pass through the hole of the ring, said secondary winding having two terminals (225, 226),
wherein the impedance matching and protection circuit (121) comprises:
   two input ends (401, 402), connected to the two terminals of the secondary winding of the coupling transformer (225, 226), respectively,
   two output ends (403, 404), connected to an RF modem for communication the RF signal to or from the RF modem, and
   a circuitry connected between the input ends (401, 402) and output ends (403, 404) for providing surge protection and impedance matching functions,
and wherein in the coupling transformer (130) the ratio of turns of the secondary winding (125) to the turns of the primary winding (126) is at least two to one.

14. The system of claim 13, wherein the low voltage terminal (114) of the shunt device (110) and the earth ground are connected only through the primary winding (126) of the coupling transformer (130).

15. The system of claim 13, wherein the shunt device is a lightning arrester.

16. The system of claim 15, wherein the lighting arrester is a gap-type lightning arrester.

17. The system of claim 13, wherein the ferrite ring of the coupling transformer comprises a NiZn ferrite having a complex permeability with an imaginary part ($\mu''_s$) that is substantially higher for the RF frequency signal (1-100 MHz) than for low frequency AC (50-60 Hz).

18. The system of claim 13, wherein the impedance matching and protection circuit (121) is fabricated on a printed circuit board and wherein the coupling transformer (130) and the impedance matching and protection circuit (121) form an RF signal coupler (120).

19. The system of claim 18, wherein the RF signal coupler (120) is encased in a non-conductive cover assembly comprising a non-metallic cap (129) and a non-metallic base plate (122) to form a weather-tight enclosure.

20. The system of claim 13, wherein the circuitry for surge protection and impedance matching comprises:
   a gas discharge tube (410) connected in parallel to the two input ends (401, 402),
   an RF transformer (420) having a primary winding and a secondary winding, the primary winding being connected to the two input ends (401, 402) and the secondary winding being connected to the two output ends (403, 404),
   a transient voltage suppression (TVS) diode array (430), connected between the two output ends (403, 404), and
   a resistor (440) being connected between the two output ends (403, 404) for providing a dominating characteristic impedance.

21. The system of claim 13, further comprising a hybrid combiner/splitter circuit (150), wherein the RF signal from the two output ends (403, 404) of the impedance matching and protection circuit (121) is conducted to the hybrid combiner/splitter circuit (150) for providing the RF signal to the RF modem.

22. The system of claim 13, wherein the primary winding (126) of the coupling transformer (130) comprises three turns and the secondary winding (125) of the coupling transformer (130) comprises eight turns.

23. The system of claim 13, wherein in the coupling transformer (130), the ratio of turns of the secondary winding to the turns of the primary winding is 8:3.

* * * * *